No. 671,778. Patented Apr. 9, 1901.
S. C. SAMS.
WHEEL.
(Application filed Apr. 5, 1900.)
(No Model.)
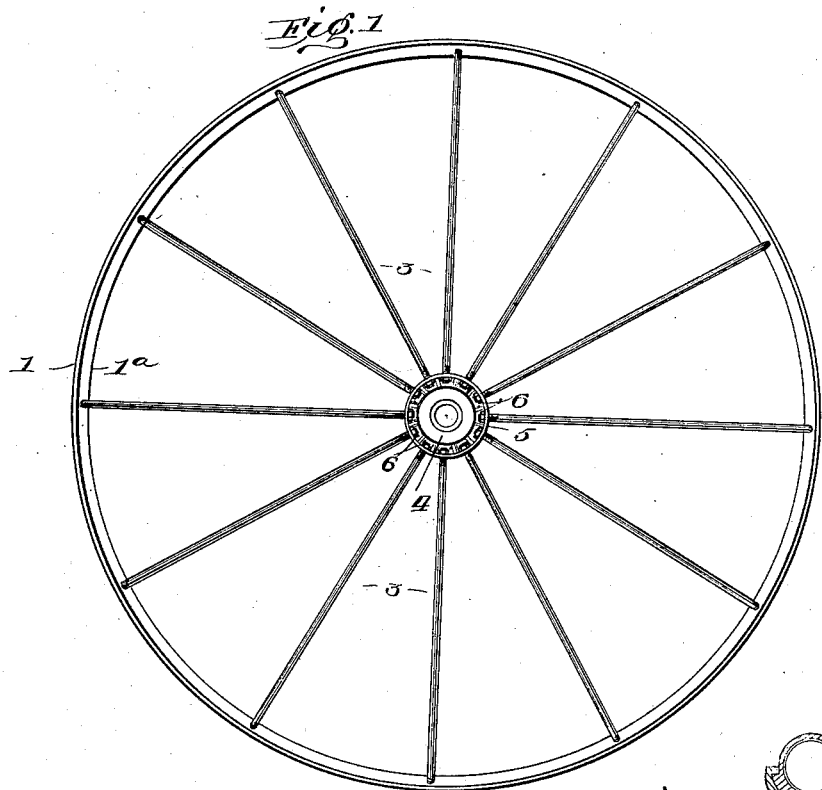
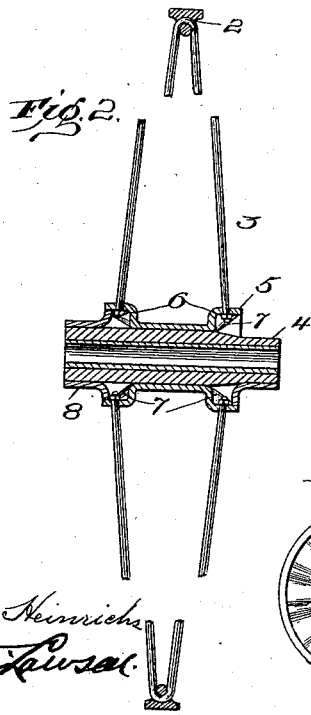
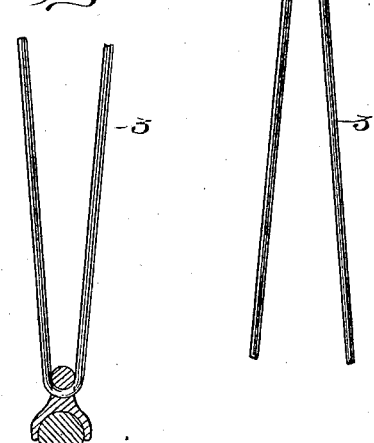
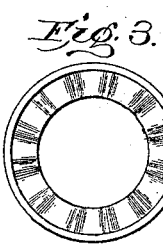
Witnesses
Inventor
Samuel C. Sams
By Victor J. Evans
Attorney

UNITED STATES PATENT OFFICE.

SAMUEL C. SAMS, OF ASPEN, COLORADO, ASSIGNOR OF ONE-HALF TO E. J. EDWARDS AND T. J. FLYNN, OF SAME PLACE.

WHEEL.

SPECIFICATION forming part of Letters Patent No. 671,778, dated April 9, 1901.

Application filed April 5, 1900. Serial No. 11,596. (No model.)

*To all whom it may concern:*

Be it known that I, SAMUEL C. SAMS, a citizen of the United States, residing at Aspen, in the county of Pitkin and State of Colorado, have invented certain new and useful Improvements in Wheels, of which the following is a specification.

This invention relates to new and useful improvements in wheels; and its primary object is to provide a light, strong, and simple device of this character adapted for use on vehicles of all classes.

To these ends the invention consists in the novel construction and combination of parts hereinafter more fully described and claimed, and illustrated in the accompanying drawings, showing the preferred form of my invention, and in which—

Figure 1 is a side elevation of the wheel with an end plate removed. Fig. 2 is a transverse section through the wheel. Fig. 3 is a detail view of the hub-band, and Figs. 4 and 5 are modified forms of rims.

Referring to said figures by numerals of reference, 1 is the rim, formed, preferably, of T-shaped iron, having an inner flange $1^a$, with holes 2 drilled therein at suitable intervals for the reception of the wire spokes 3. If desired, these tires may be formed with a concave outer surface, as shown in Fig. 4, for use with cushion-tires, and said edges may be turned inward, as shown in Fig. 5, for use with pneumatic tires, &c.; nor do I limit myself to a tire constructed entirely of metal, as the fellies may be of wood and have a metal band or strip secured around the outside of and embedded within the wood of the felly, said band having holes for the reception of the spokes.

4 is the wooden hub of the wheel, having a band 5 secured therearound, the edges thereof being raised, as shown, and perforated to receive the ends of the spokes 3, which pass through the rim, as hereinbefore described. These ends are threaded and secured by nuts 6 engaging therewith. Strengthening-ribs, as 7, are provided within the hub-band 5, as shown, extending to the edges thereof at regular intervals and preventing the same from being bent outward from the center. End plates 8 are fitted over the ends of the hub, and these bend up under the edge of the hub-band and against the nuts 6, preventing the same from unscrewing, as is obvious.

It will be seen that the spokes 3 pass from one edge of the hub-band to the other and can be readily tensioned by means of the nuts 6 thereon.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

It is obvious that the hub may, if desired, be formed of iron or any other desired material, and in lieu of extending the spokes directly from the hub to the felly the same may be, if desired, crossed or arranged in any other suitable manner.

Having thus fully described my invention, what I claim as new, and desire to secure by Letters Patent, is—

1. In a wheel, the combination with a hub, of a band mounted thereon, a concave rim having an inner flange, inwardly-projecting edges to said rim, and a spoke secured to the band and passing through the flange.

2. In a wheel, the combination with a concave rim, of inwardly-projecting edges to said rim, an inner flange, a hub, a band mounted thereon and having raised edges, strengthening-ribs therein, and a spoke within the flange of the rim and fastened at opposite ends to the raised portions of the band.

3. In a wheel, the combination with a concave rim, of inwardly-projecting edges thereto, an inner flange, a hub, a band secured thereto and having raised edges, strengthening-ribs therein, a spoke engaging the rim-flange and the ends thereof projecting through the raised portion of the hub-band, securing-nuts within the band and upon the ends of the spoke, and end plates upon the hub projecting under the hub-band and adapted to lock said nuts in position.

In testimony whereof I affix my signature in presence of two witnesses.

SAMUEL C. SAMS.

Witnesses:
L. R. FECHTIG,
E. J. EDWARDS.